Patented Nov. 27, 1945

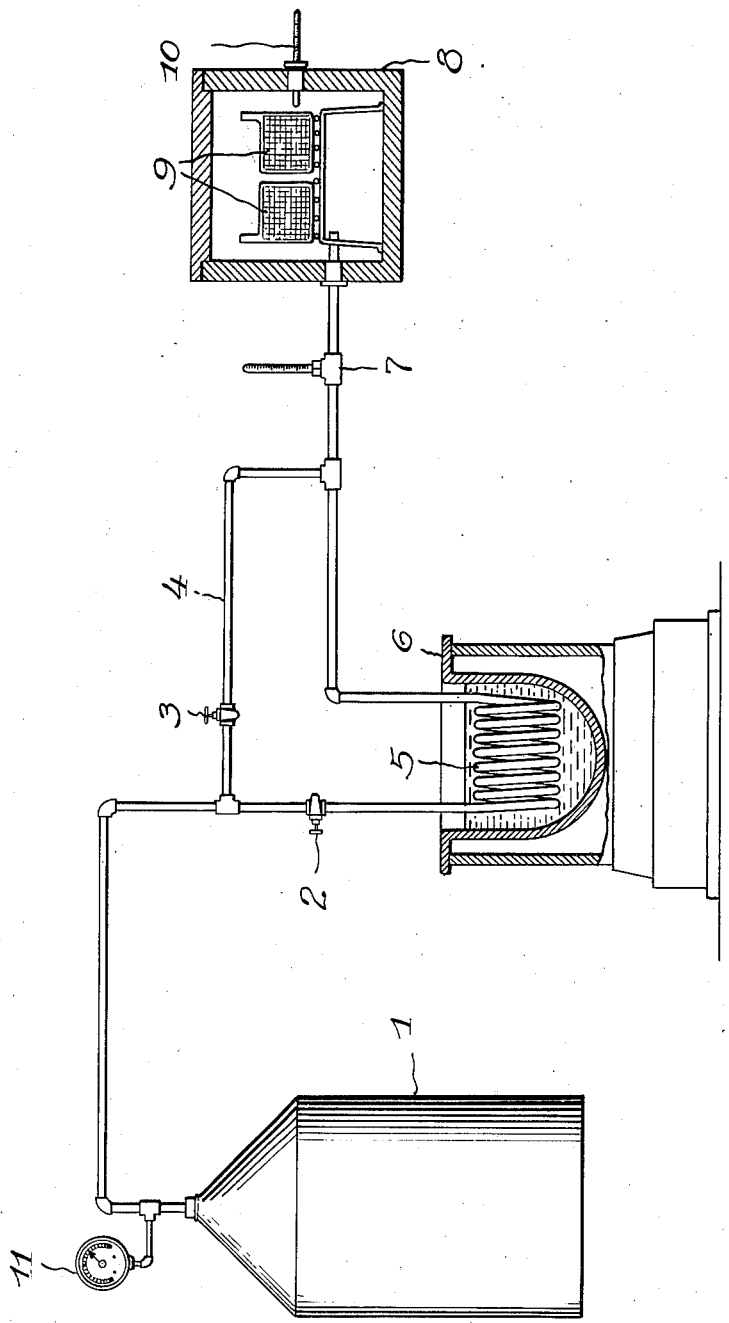

2,389,894

UNITED STATES PATENT OFFICE 2,389,894

DRY CHARGED ACCUMULATOR PLATE

Melvin F. Chubb and Percy F. Ebert, Joplin, Mo., assignors to The Eagle-Picher Company, a corporation of Ohio Application December 3, 1943, Serial No. 512,738

5 Claims. (Cl. 136—33)

Our invention relates to a method of drying storage battery plates of the lead-acid type and more particularly charged negative plates, the active material of which consists of sponge lead.

Dry charged batteries of the lead-acid type are preferred for ocean shipment, the absence of the acid eliminating one of the hazards involved. They are also desirable for shipment to and use in remote parts of the world where charging facilities are not available as the dry charged batteries may be stored indefinitely without depreciation and are thereafter put into service by merely filling them with the proper strength and amount of dilute sulphuric acid.

The most difficult step in the preparation of dry charged batteries is the drying of the charged, or "formed" negative plate. The active material of the formed negative plate consists of spongy, metallic lead in an extremely fine state of subdivision. In drying the plate, the primary concern is to prevent the oxidation of this finely divided lead, as any lead oxide produced on drying reacts with the sulphuric acid when the battery is filled, reducing the potential capacity of the battery.

In our studies of methods for drying plates of the lead acid storage battery type, we have discovered a simple, low-cost, easily controlled method and apparatus that retains the highest percentage of the original plate capacity known to us. Military specifications are based on plates heretofore available, and require a retained capacity of 50%. At the normal 20-hour or 6-hour testing rates our plates have consistently retained over 90% of their original capacity and in many cases have retained 95 to 98%.

In its broadest sense our procedure comprises subjecting the washed, formed, lead-acid type plates to an atmosphere of superheated steam at substantially atmospheric pressure, maintaining that superheated steam atmosphere by continuous admission of superheated steam until all the moisture within the active material of the plates has been converted to steam, reducing the temperature by admitting saturated steam, and removing the plates to the air, whereupon the residual steam in the pores of the plates is immediately dissipated and the plates are dry.

Our new process has the unique result that it produces smooth, sound plates free from shrinkage checks or cracks. As soon as the wet plates to be dried are loaded into the oven, moisture from the steam will tend to condense on the cold plates, keeping them moist and preventing loss of moisture until the temperature of the entire plate has been raised to above the boiling point of water, at which time all the moisture within the plate changes rapidly to steam, and the plate becomes substantially dry except the very small amount of steam held in the plate until the oven is opened.

In addition, our use of superheated steam as the direct heating agent at the same time rapidly sweeps the oven free of oxygen so that by the time the plates are hot and dry enough to react readily with oxygen, they are in an inert steam atmosphere and so remain until the drying process is completed.

Our invention applies only to plates for batteries of the lead-acid type wherein the charged, or formed, positive plates consist largely of lead peroxide with some residual lead monoxide and lead sulphate, and wherein the charged or formed negative plates consist largely of very finely divided spongy metallic lead together with minor percentages of residual lead monoxide and lead sulphate, together with colloidal or inert materials added to secure special performance features.

The plates for our invention may be prepared from any suitable lead materials, processed in any conventional manner prior to formation, and formed, or given their initial charge, in any of the process variations so well known in the art. All we require of the plates is that they be fully formed so as to have developed capacity suitable for application to the lead-acid type storage battery.

Following formation, the positive and negative plates are unmeshed, and handled either as single plates, racks of plates, or groups of plates. That matter is a question of what the individual user of our process finds most adaptable to his other equipment and has no bearing on the results attained or the successful use of our process.

Our process begins with the thorough washing of the formed plates to remove substantially all of the mechanically held dilute sulphuric acid from the forming bath. In the previous disclosures of means of drying formed plates, the statement is made that plates may or may not be washed prior to drying. We have discovered that this is not correct. For retention of capacity of the order which we attain it is essential that both the positive and the negative plates be thoroughly washed.

As an embodiment of our invention, we refer to the attached schematic drawing, wherein steam at low pressure is generated in boiler 1 and delivered to valves 2 and 3. Valve 3 enables wet saturated steam as generated to be fed into the drying cabinet through bypass 4. Valve 2 enables the saturated steam to be passed through superheat coils 5 immersed in a bath of molten lead in lead pot 6. In passing through the coils 5, the steam is raised to a preferred temperature of above 700° F. as measured by a thermometer or thermocouple in well 7. From here the steam passes into insulated drying cabinet 8, either in a single jet for a small cabinet, as shown, or in multiple jets distributed the length of the cabinet in the case of a commercial size drier capable of holding thousands of plates. The temperature of the steam surrounding the plates 9 is measured by thermometer 10. The exact design of the cabinet we do not specify, other than that it be tight at the bottom to prevent air being drawn through by convection.

We prefer a cabinet with the doors on top (not shown), the sides and bottom being substantially sealed. Excess steam then escapes at the top through the cracks around the doors, but no air can enter to cause oxidation.

In carrying out our invention the formed plates are unmeshed, and for convenience in handling the positives are placed in one rack, and the negatives in another, individually spaced in the racks from ⅛" to ½" apart to allow free access of washing water and of drying steam. The racks of plates are then immediately immersed in water, preferably changing continuously, and remain in the water until the dryer is to be loaded.

The racks of plates are then removed from the water and placed in the drying cabinet as quickly as possible to minimize air drying, the cabinet doors closed, and superheated steam admitted. A table of typical temperature readings of both the steam entering the oven and the oven atmosphere are shown herewith.

| Time, min. | Oven temp., °F. | Steam temp., °F. | |
|---|---|---|---|
| 5 | 218 | 730 | |
| 10 | 218 | 730 | |
| 16 | 230 | 730 | |
| 24 | 230 | 730 | |
| 32 | 235 | 730 | |
| 38 | 235 | 730 | |
| 45 | 250 | 735 | |
| 60 | 260 | 735 | |
| 66 | 275 | 735 | |
| 71 | 285 | 735 | |
| 80 | 310 | 735 | |
| 85 | 325 | 685 | |
| 90 | 365 | 730 | Saturated steam added. |
| 96 | 345 | 380 | |
| 100 | 340 | 365 | Super heater turned off. |
| 106 | 275 | 212 | |

Superheated steam is admitted continuously until the temperature within the oven reaches at least 300° F., but not over 375° F., at which time we consider all the moisture within the plates as having been vaporized. Thereupon saturated steam is admitted along with some superheated steam so that the entering steam temperature is below 400° and this ratio of saturated steam to superheated steam slowly increased until all saturated steam is entering the oven. We find that 300° F. to 325° F. is the critical temperature of spongy metallic lead, and that if the oven is opened while its atmospheric temperature is 300° or higher, the negative plates will ignite spontaneously when exposed to air.

Therefore, the oven atmosphere is reduced to below 300° F., or preferably to 250° F. before the doors are opened to remove the racks of plates. When the above described steps have been taken, the racks of plates are then removed to the open air atmosphere, the occluded steam dissipates and the plates are dry. After cooling they are ready to store until needed or may be used at once in the preparation of dry charged batteries.

Having described our invention, we claim:

1. The process of treating formed negative plates of the lead acid storage battery type which comprises washing the formed negative plate to remove retained sulphuric acid, subjecting the plates to an atmosphere of superheated steam at substantially atmospheric pressure, and gradually reducing the atmosphere of superheated steam to a saturated steam atmosphere, and removing the plates to the air.

2. The step-by-step process of treating formed storage battery plates of the lead acid type comprising the steps of washing the formed plate to remove retained sulphuric acid, subjecting the washed plates to an atmosphere of superheated steam at substantially atmospheric pressure, gradually reducing the atmosphere of superheated steam to a saturated steam atmosphere and removing the dried plates to the air.

3. The process of preparing dry charged plates of the lead acid storage battery type which comprises the steps of washing the formed plates to remove retained sulphuric acid, and thereafter subjecting the formed plates at substantially atmospheric pressure to an atmosphere of superheated steam with an entering temperature of approximately 700° F., gradually reducing the atmosphere of superheated steam to a saturated steam atmosphere and removing the plates to the air.

4. The process of preparing formed storage battery plates of the lead acid type which comprises washing the formed plate to remove retained sulphuric acid and thereafter subjecting the formed plate to an atmosphere of superheated steam at substantially atmospheric pressure at a temperature varying from 300° F. to 375° F., admitting saturated steam with superheated steam at an entering steam temperature below 400° F. until saturated steam only is entering the oven, reducing the temperature below 300° F. and removing the plates to the air.

5. The step-by-step process of treating formed storage battery plates of the lead acid type comprising the steps of subjecting the formed and washed plates to an atmosphere of superheated steam at substantially atmospheric pressure, continuously admitting superheated steam until all the moisture within the active material of the plate has been converted to steam.

MELVIN F. CHUBB.
PERCY F. EBERT.